C. A. GEHMAN.
MEASURING PUMP.
APPLICATION FILED OCT. 8, 1910. RENEWED MAY 1, 1914.
1,191,298.
Patented July 18, 1916.
3 SHEETS—SHEET 3.
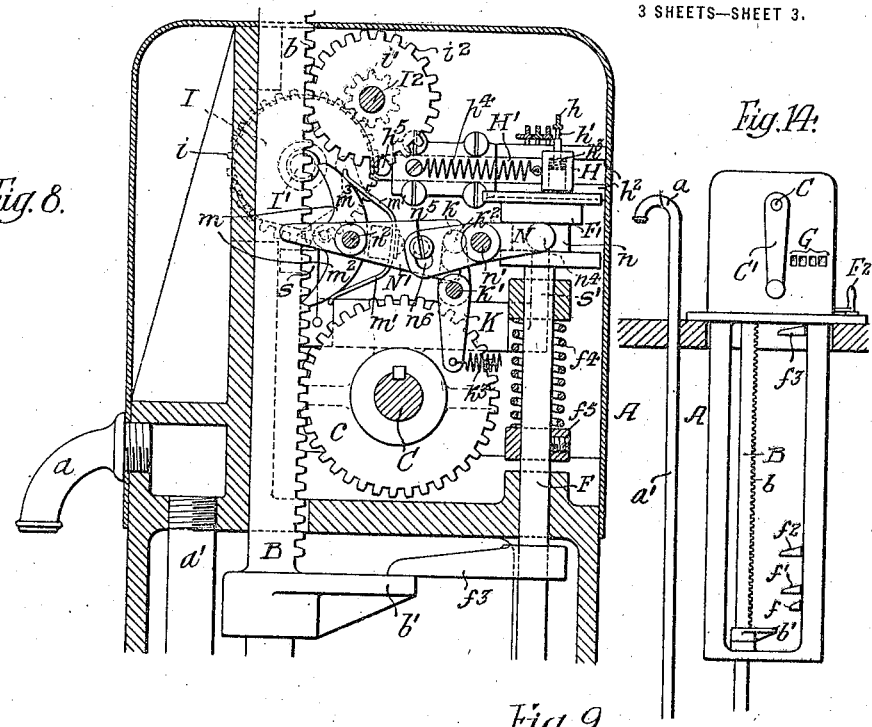
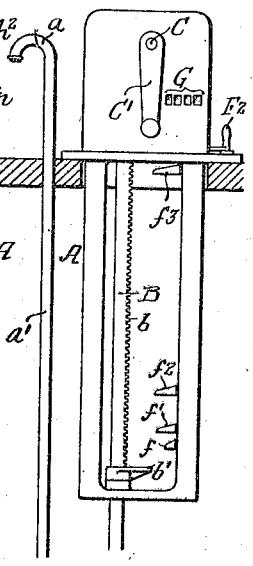
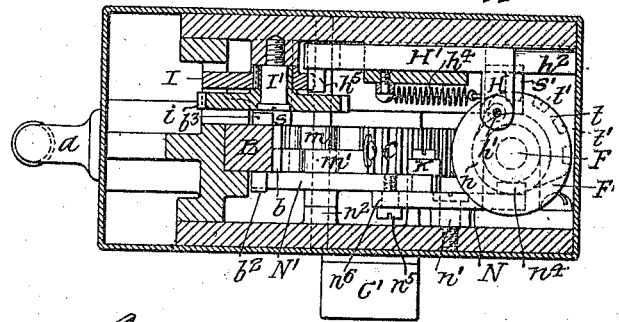
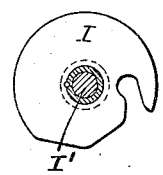
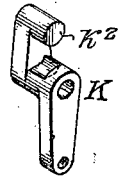
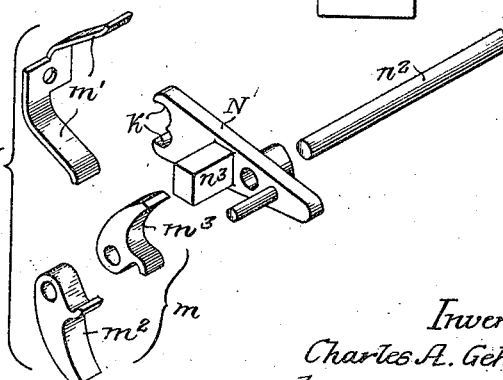
Witnesses.—
Wills A. Burrowes.
Walter Chiene.
Inventor.—
Charles A. Gehman.
by his Attorneys.—
Howson Howson

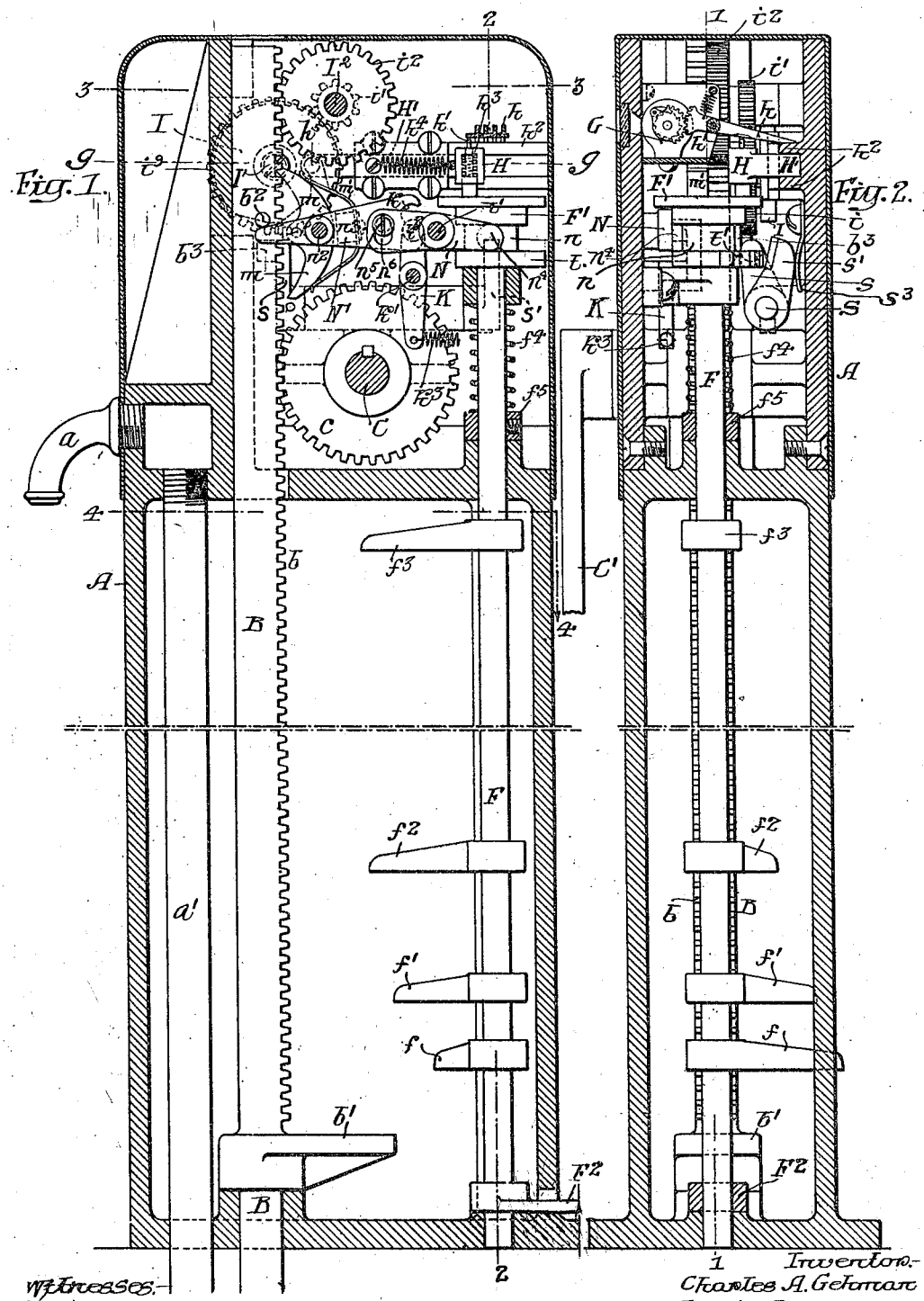

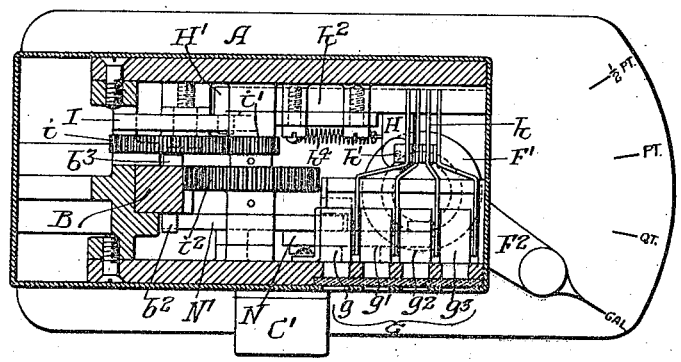
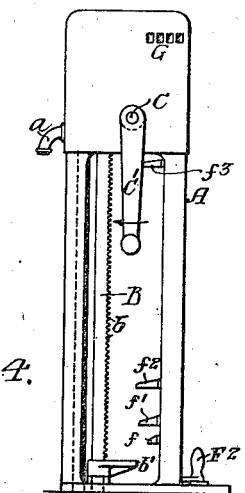
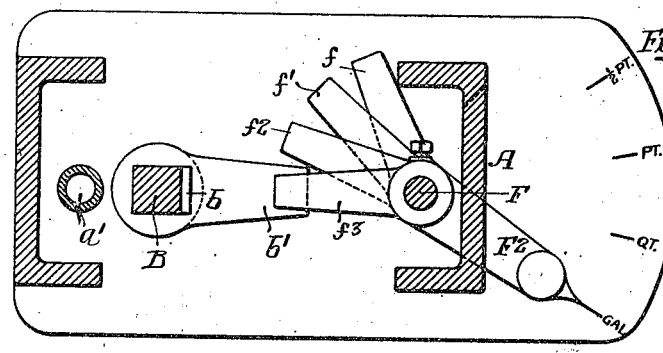
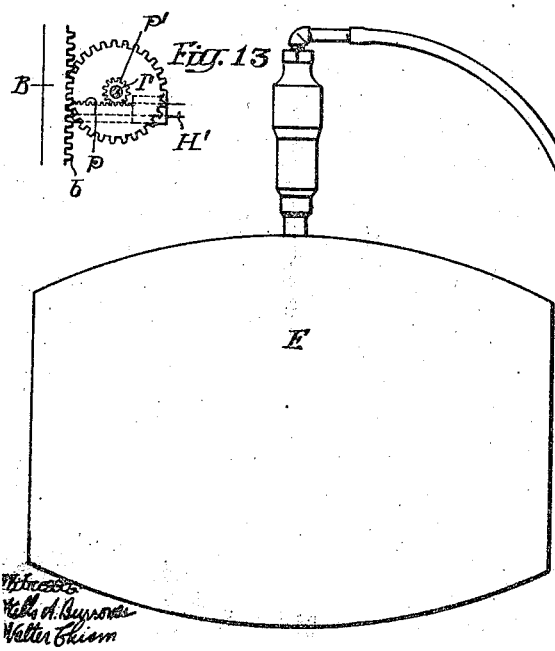
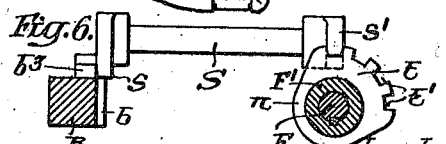

UNITED STATES PATENT OFFICE.

CHARLES A. GEHMAN, OF PHILADELPHIA, PENNSYLVANIA, ASSIGNOR TO GEHMAN PUMP COMPANY, OF PHOENIX, ARIZONA, A CORPORATION OF ARIZONA.

MEASURING-PUMP.

1,191,298.

Specification of Letters Patent. Patented July 18, 1916.

Application filed October 6, 1910, Serial No. 586,008. Renewed May 1, 1914. Serial No. 835,768.

*To all whom it may concern:*

Be it known that I, CHARLES A. GEHMAN, a citizen of the United States, residing in Philadelphia, Pennsylvania, have invented certain Improvements in Measuring-Pumps, of which the following is a specification.

My invention relates to mechanism designed for the purpose of dispensing or delivering measured quantities of liquid, and the object of my invention is to construct a pump for measuring liquids in different quantities, and to provide means, simultaneously operable with the pumping mechanism for independently registering the several quantities of liquid delivered. These and other features of my invention are more fully described hereinafter, reference being had to the accompanying drawings, in which:

Figure 1, is a sectional elevation on the line 1—1, Fig. 2; Fig. 2, is a sectional elevation on the line 2—2, Fig. 1; Fig. 3, is a sectional plan view on the line 3—3, Fig. 1; Fig. 4, is a sectional plan view on the line 4—4, Fig. 1; Figs. 5 and 6, are views illustrating details of my invention; Fig. 7, is a view showing my improved pumping mechanism attached to a barrel; Fig. 8, is a sectional elevation showing the arrangement of the parts when the pump rod has been raised to register one gallon of liquid; Fig. 9, is a sectional plan view on the line 9—9, Fig. 1; Fig. 10, is a detail of a cam and shaft which I employ; Fig. 11, is a detached perspective view of certain elements used in my improved structure; Fig. 12, is a perspective view of a double ended lever which I employ; Fig. 13, is a view of modified means for shifting the register actuating mechanism, and Fig. 14, is a view showing a modified structure within the scope of my invention.

While the structure forming the subject of my invention is particularly adapted for measuring and registering small quantities of liquids, such as whisky, and also for measuring oils, gasolene, and the like,—it is designed and intended for accurately measuring and registering any liquid. In the present instance the pump is designed for measuring, delivering and registering halfpints, pints, quarts and gallons, but it will be understood that the quantities may be varied as desired.

In the accompanying drawings, A is a casing, within which is a pump rod B having a rack $b$ at one side, with which meshes a pinion $c$, on a shaft C, having an operating handle C'. The lower end of the rod B carries a plunger $d$ mounted in a pump cylinder D. This plunger carries check valves $d'$ which open on the down stroke and close on the up stroke. The pumping mechanism is provided with a nozzle $a$, connected to the upper end of the pump cylinder D by a pipe $a'$ through which liquid is forced from the pump cylinder for discharge through said nozzle. The lower end of the cylinder D is connected by a pipe $e$ to a container E for the liquid, and this container may be a barrel, as indicated in Fig. 7, or any other suitable vessel.

Secured to the pump rod B is a trip arm $b'$; said pump rod B and arm $b'$, constituting a pumping device. The arm $b'$, is arranged to come in contact with any one of a series of arms or measuring stops $f$, $f'$, $f^2$, $f^3$, secured to a register-actuating rod F, which is rotatable to bring any one of said arms or stops into alinement with the trip arm $b'$; said rod F being capable of slight vertical movement for a purpose hereinafter set forth. Of the four arms shown in the present instance, one is for half-pints; one for pints; one for quarts, and one for gallons.

G is a registering device having four independent registers $g$, $g'$, $g^2$, $g^3$, as shown in Fig. 3. These registers have projecting arms $h$, acted upon by a plunger $h'$ carried by a head H forming a selector; said head being adapted to slide in guides $h^2$. This head is movable so as to bring the plunger in line with any one of the registering arms $h$; said plunger resting upon a disk F' on the upper end of the rod F so that when the latter is raised, the plunger $h'$ will be forced upward, striking one of the arms $h$. The plunger is retained on the disk by a spring $h^3$ and the rod and its disk are held down by a spring $f^4$ which bears against a collar $f^5$ secured to the rod F so that the latter is returned to its normal lowered position as soon as the trip arm $b'$ is disengaged from any one of the arms of the rod F.

The selector head H is carried by a slide H' having a pin $h^5$ which bears against a cam I, (shown by dotted lines, Figs. 1 and 8, and in detail, Fig. 10), mounted on a stud I'. A gear wheel $i$, also mounted on this stud, meshes with a pinion $i'$ on a shaft $I^2$, and on this shaft $I^2$ is a gear wheel $i^2$ which meshes with the rack teeth $b$ on the pump rod B, so that as the pump rod is raised or lowered the cam I will be turned to shift the slide H' and with it the selector head H. A tension spring $h^4$ connected to the slide H' tends to hold its pin $h^5$ against the face of the cam. The position of the register-actuating plunger $h'$ is controlled by the cam I, which has a plurality of faces for engagement by the pin $h^5$ on the slide H'. This cam is turned by the gearing, as described, when the pump rod is actuated, and the extent of movement of the cam is determined by the extent of movement of the pump rod so that the plunger $h'$ will be in proper position for registration of the desired amount when the pump rod has reached the limit of its upward movement. This may be clearly understood upon reference to Figs. 1 and 8; the pin $h^5$ being shown at its extreme inactive position in Fig. 1, being disposed in the notch of the cam I, while in Fig. 8, the pin $h^5$ is in engagement with the periphery of the cam; the slide H' having been moved over to the full extent to bring the plunger $h'$ in position to effect registration of a gallon of liquid. The register-actuating rod F is turned by a hand lever $F^2$ to bring the several arms $f$, $f'$, $f^2$, $f^3$, in line with the arm $b'$ of the pump rod B.

Mounted in a groove $n$ in the head F' of the rod F is a projection $n^a$ of a lever N pivoted at $n'$ to the casing, and this lever in turn is connected to a lever N' which is pivoted at $n^2$ to the casing, by means of a pin $n^5$ on the lever N' passing through a slot $n^6$ in the lever N. Mounted on the pivot portion $n^2$ is a double pawl $m$, and secured to a lug $n^3$ on the arm N' are spring fingers $m'$ which bear upon the parts of the double pawl and these springs hold either one or the other of the parts $m^2$ or $m^3$ of the pawl in yielding engagement with the rack teeth on the pump rod. The lever N' is in the path of a pin $b^2$ on the pump rod so that when the pump rod is in its lowest position, as in Fig. 1, said pin strikes the lever N' and shifts the pawl $m$; allowing the pump rod to be raised and preventing the return of the pump rod until the arm $b'$ strikes one of the arms $f$, $f'$, $f^2$, $f^3$, of the register-actuating rod F.

When the arm $b'$ of the pump rod B is raised, it strikes the arm on the rod F which has been set in its path, and thereby raises said rod. The lever N, in engagement with the rod F, is then actuated to lower the pin $n^5$ on the lever N' to shift the section $m^2$ of the double pawl $m$ into mesh with the rack $b$ so that the pump rod will be arrested against a further upward movement, as clearly shown in Fig. 8. As soon as the pump rod is started on its downward movement, the spring $f^4$ acts to lower the register-actuating rod F but, as the lever N is slotted, the lever N' is not affected until the pin $b^2$ on the pump rod strikes the same; thereby throwing the pawl $m^2$ out of mesh with the rack $b$ and the pawl $m^3$ into mesh therewith. Thus the function of the pawl $m^2$ is to prevent further upward movement of the pump rod after the arm $b'$ has struck one of the arms on the rod F. The pawl $m^3$ acts to keep the pump rod from being lowered after it has started upward or until the rod F has been raised by the arm $b'$, and has actuated the described mechanism to register the amount indicated by the arm $F^2$.

The pin $b^2$ is so positioned on the pump rod that it actuates the lever N' just as the pump rod reaches its lowest position, as shown in Fig. 1. In order to hold the lever N' in either of its two positions, I form a pair of notches $k$ in the rear end of said lever, and pivot a lever K on a pin $k'$ projecting from the casing. This lever carries a projection $k^2$ which is arranged to engage either of the notches $k$ of the lever N'. A spring $k^3$ yieldingly holds the lever K in both positions, and when the lever N' is forced from one position to another the spring will yield allowing the lever N' to be shifted. Other means for holding the lever N' in position may be resorted to without departing from the essential features of the invention. By the use of the mechanism shown at $m^2$, $m^3$, N, N', K and $b^2$ the movement of pump rod cannot be reversed until the latter has reached the limit of a predetermined upward stroke, or that of its lowest position.

In order to lock the rod F after the pump rod has commenced its upward stroke, I provide said pump rod B with a side projection $b^3$, (Fig. 5) forming a cam which, when the said pump rod B is in its lowest position, contacts with an arm $s$ on a rock shaft S and in so doing keeps a locking arm $s'$, also mounted on the shaft S, out of engagement with notches $t'$ in a disk $t$ of the head F', so that while the rod F carrying the measure gage arms may be raised it cannot be turned after the pump rod is once set in motion. The raising of the pump rod B raises the cam $b^3$ out of engagement with the arm $s$ and allows a spring $s^3$ to press the arm $s'$ into one of the notches $t'$ which corresponds to the gage arm in the path of the trip arm $b'$. The rod F is thereby locked against movement by the handle $F^2$ after the initial movement of the pump rod B. Thus an operator cannot change the volume of the measuring device, after the handle C' has been turned, until the trip arm $b'$ raises the gage arm set and has returned to its lowest position to cause the cam $b^3$ to engage the arm $s$; the latter operation withdrawing the arm $s'$ from the notch $t'$.

While I have shown the structure forming the subject of my invention as arranged to measure and deliver half-pints, pints, quarts and gallons, it will be understood that in some instances the gallon may be omitted. In this case, the means for shifting the head H carrying the plunger $h'$ may be modified, as illustrated in Fig. 13, wherein the slide H' is shown as provided with teeth $p$ to engage the teeth of a wheel $p'$ actuated by the rod B.

In the drawings, I have illustrated the casing of the pump mechanism as extending entirely above a floor or platform, but in some instances part of the casing may extend below the platform, and the operating shaft C and handle C' may be at the extreme upper end of the casing with the discharge nozzle $a$ positioned independently of the casing, as shown in Fig. 14. The design of the pump will be varied according to the use for which it is intended.

It will be seen by the above construction that the pump discharges the liquid only on the up stroke, and that when the pump rod and its plunger return, the liquid passes the plunger through the openings for the check valves.

The operation of the mechanism is as follows: If the pump is to measure and register quarts, for instance, the register-actuating rod F is turned by the arm $F^2$ until the stop $f^2$ is in line with the arm $b'$ of the pump rod B, and a container is placed under the nozzle $a$. The crank handle C' is then turned in the direction of the arrow, which will cause the pump rod B to move upward, carrying with it the plunger $d$ lifting the liquid in the cylinder D above the plunger and causing it to flow out of the nozzle $a$. As soon as the rod commences its upward movement, the rocking lever $s'$ enters one of the notches in the disk $t$ of the rod F; locking the rod against further movement until the rod B has been returned to the position illustrated in Fig. 1. When the arm $f^2$ is engaged by the arm $b'$ it lifts the register-actuating rod F and causes the disk F' to raise the plunger $h'$; bringing it into engagement with one of the arms of the registering mechanism to register the quantity of liquid passing through the pump: the plunger $h'$ being previously adjusted to its proper position through the medium of the cam I which is actuated by the mechanism controlled by the pump rod B. When the register-actuating rod F is raised, it not only raises the plunger $h'$ but also actuates the levers N, N', and shifts the members $m^2$ and $m^3$ of the double pawl $m$ so as to allow the pump rod B to return on reversing the movement of the crank C'. If, after measuring quarts, pints are to be measured then the arm $F^2$ is turned so as to bring the stop $f'$ in lines with the arm $b'$ on the rod. The pump can then be operated and will measure and register pints. Thus it will be seen by the above construction that while all liquid passing through the pump is measured, the amount pumped each time is registered, so that for instance in bar work where half-pint, pint and quart bottles are to be filled, the number of half-pints, pints and quarts are registered independently and by adding these several measures together it will give the quantity of liquid passing from the barrel or container through the pump.

The invention can be applied to the measuring of gasolene, oils, or other liquids, and instead of being arranged to measure and register half-pints, pints, quarts and gallons, it may be arranged for measuring and recording two, three or more gallons without departing from the essential features of the invention. While I employ an arm such as $b'$ secured to a movable portion of the pumping device as the means for actuating the arms $f$, $f'$, $f^2$, $f^3$, it will be understood that the arm could be made adjustable with respect to the pumping device, or the arms $f$, $f'$, $f^2$, $f^3$, may be actuated directly from said pumping device, without departing from the spirit of my invention.

I claim:

1. The combination, in a measuring apparatus, of a series of registers; a selector; means for moving the selector into alinement with any one of the registers; a pumping device; a plurality of arms forming measuring stops disposed between the pumping device and the selector; and means for shifting any one of said stops into position to be moved by the pumping device so as to actuate a given register through the medium of the selector and to stop the discharge movement of the pumping device.

2. The combination of a cylinder; a pump-plunger; a pumping device connected to said plunger; a series of registers; selective means including a carrier having arms for engagement by the pumping device to actuate one of the registers; and means for operating the carrier to bring one of the arms carried thereby into position to be engaged by the pumping device.

3. The combination of a casing; a pump-rod mounted therein; a register-actuating rod mounted in the casing; radially disposed arms spaced apart at predetermined distances mounted on said register-actuating rod; an arm-engaging member mounted on the pump-rod; means for rotating the shaft to bring any one of the radially disposed arms into the path of the pump-rod arm-engaging member; means for reciprocating the pump-rod; a cylinder; a plunger carried by the pump-rod and disposed in said cylinder; an outlet for said cylinder; a series of registers; and selective means operable by the pump-rod for connecting any one of the registers with the register-actuating rod.

4. The combination of a casing; a pump-rod mounted in the casing; a register-actuating rod also mounted in the casing; a plurality of radially-disposed arms mounted on said register-actuating rod and spaced apart at predetermined distances; an engaging member on the pump-rod adapted to contact with any one of said arms; means for moving the register-actuating rod to aline any one of the arms thereon with the engaging member of the pump-rod; means for reciprocating the pump-rod; a cylinder; a plunger on the pump-rod mounted in the cylinder; an outlet for said cylinder; a series of registers; means for connecting any one of the registers with the register-actuating rod, said means being operated by the pump-rod; a double pawl for engaging the pump-rod; and means for shifting said pawl on the movement of the register-actuating rod so that the said pump-rod must be moved its full extent to insure the delivery of the full quantity of liquid.

5. The combination, in a measuring pump, of a casing; a pump-rod; a cylinder; a plunger mounted in the cylinder and connected to the pump-rod; a discharge pipe connected to the cylinder; a series of independent registers; means for connecting any one of the registers with the pump-rod; and means for limiting the movement of said pump-rod; said pump discharging the liquid on the upward movement of the plunger.

6. The combination of a casing; a pump-rod having a rack; a plunger connected to said rod; a cylinder in which the plunger is mounted; a discharge pipe leading from the cylinder; an operating shaft; a gear wheel on the shaft in mesh with the rack of the pump-rod; a handle for turning said shaft; a register-actuating rod mounted in the casing; a series of arms radially disposed on the register-actuating rod, each arm being in a different horizontal and vertical plane; an engaging member on the pump-rod; means for moving said register-actuating rod to aline any one of the said arms with the engaging member on the pump-rod whereby the register-actuating rod may be moved longitudinally in one direction; a spring for returning the register-actuating rod to its normal position after release from contact with the engaging member on the pump-rod; a series of registers; actuating levers therefor; a sliding head; a plunger carried by the sliding head and arranged to travel between the registering shaft and the registering levers; and means for moving the sliding head as the pump-rod is raised.

7. The combination of a casing; a pump-rod; a register-actuating rod; registering mechanism; selective means for actuating the registering mechanism through the medium of the register-actuating rod; a notched disk on the register-actuating rod; a locking lever arranged to engage the notches of the disk; a cam on the pump-rod; and a lever controlled by the cam so that when the pump-rod is in its lowest position the locking lever is held out of engagement with the disk of the register-actuating rod; the locking lever entering one of the notches in the disk as soon as the pump-rod is raised.

8. The combination of a casing; a pump-rod having teeth on one side forming a rack; means for moving the pump-rod; a register-actuating rod; an engaging member on the pump-rod; a series of arms on the register-actuating rod, any one of which may be positioned for actuation by the engaging member on the pump-rod; a series of registers, each register being provided with an operating lever; a plunger; means for shifting the plunger over the end of the register-actuating rod into line with any one of the registering levers; a double pawl for engagement with the teeth of the rack; a lever having a spring bearing against said pawl; a second lever for actuating the first mentioned lever and engaged by the register-actuating rod; a locking lever for locking the first mentioned lever in either of its two positions; and a pin on the pump-rod arranged to shift the first mentioned lever when the pump-rod reaches its lowest position, the levers being shifted by the register-actuating rod when the latter is raised.

9. The combination, in a measuring apparatus, of a pump-rod; a series of registers; registering means; means for actuating the registering means to predetermine the discharge movement of the pump-rod; and selective mechanism movable into alinement with any one of the said registers and actuated by the register-actuating rod to operate a register.

10. The combination, in a measuring apparatus, of a pumping device; registering mechanism including a series of registers and a register actuating rod actuated by the pumping device; a selector disposed between the register-actuating rod and the registers, said registering mechanism being actuated by the pumping device through the medium of the selector; means for actuating the register-actuating rod independently of the pumping device; means for automatically locking the register-actuating rod against said independent movement after the pumping device has been moved from its normal position; and means for automatically unlocking the said register-actuating rod when the pumping device has returned to its normal position.

11. The combination, in a measuring apparatus, of a pumping device; a series of registers; each of said registers having an operating lever; a register-actuating rod actuated by the pumping device; selective mechanism actuated by the pumping device and including means for actuating any of the registering levers; said means being actuated by the register-actuating rod; means for actuating the registering shaft independently of the pumping device; means for automatically locking the register-actuating rod against said independent movement; said locking means operating coincidently with the movement of the pumping device out of its normal position; and means for automatically unlocking the register-actuating rod to permit the independent movement thereof; said latter means operating coincidently with the return of the pumping device to its normal position.

12. The combination, in a measuring apparatus, of a pumping device; a series of registers; each of said registers having an operating lever; a register-actuating rod actuated by the pumping device; selective mechanism actuated by the pumping device and including means engaging any of the registering levers; said means being actuated by the register-actuating rod; means for actuating the register-actuating rod independently of the movement of the pumping device; means for automatically locking the register-actuating rod against said independent movement; said locking means operating coincidently with the movement of the pumping device from its normal position; means for automatically unlocking the register-actuating rod to permit the independent movement; said unlocking means operating coincidently with the return of the pumping device to its normal position; and means for automatically restoring the register-actuating rod to the position occupied before being actuated by the pumping device.

13. The combination, in a measuring apparatus, of a pump-rod; a register-actuating rod; a series of registers having actuating levers; an engaging member on the pump-rod; a series of radially disposed arms on the register-actuating rod; means for actuating the pump-rod; means for moving the register-actuating rod to bring any one of its arms into alinement with the engaging member of the pump-rod so that when the pump-rod is actuated the engaging member therein will move the register-actuating rod; and register-actuating means movable into alinement with any one of said register operating levers and actuated by the register-actuating rod.

14. The combination, in a measuring apparatus, of a series of registers; a selector; means for moving the selector into alinement with either of the registers; a pumping device; a plurality of arms forming measuring stops interposed between the pumping device and the selector; means for shifting any one of said stops into position to be moved by the pumping device so as to actuate a given register through the medium of the selector and to stop the discharge movement of the pumping device; and a carrier for the arms forming the measuring stops.

15. The combination of a cylinder; a pump-plunger; a pumping device connected to said plunger; a series of registers; selective means including a carrier having arms for engagement by the pumping device to actuate any one of the registers; means for operating the carrier to bring one of the arms carried thereby into position to be engaged by the pumping device; means for effecting coöperative movement of the registers with respect to the pumping device; and means for operating the pumping device.

16. The combination of a casing; a pump-rod mounted therein; a register-actuating rod mounted in the casing and paralleling the pump-rod; an arm mounted on said register-actuating rod; an arm-engaging member mounted on the pump-rod; means for reciprocating the pump-rod; a cylinder; a plunger carried by the pump-rod and disposed in said cylinder; an outlet for said cylinder; a register; and selective means operable by the pump-rod for connecting said register with the register-actuating rod.

17. The combination with a pumping mechanism including a casing; a pump-rod having a toothed rack mounted in said casing; an engaging member carried by the pump-rod; a cylinder; a plunger connected to the pump-rod and operable in the cylinder, and an outlet for the cylinder; of a register-actuating rod also mounted in the casing; arms mounted on said register-actuating rod, the latter being operable to bring any of said arms into position for engagement by the engaging member on the pump-rod; a double pawl engaging the teeth of the pump-rod; levers actuated by said register-actuating rod for reversing the pawl after the pump-rod has moved a predetermined distance to permit return of the pump-rod to its normal position; a pin on the pump-rod for re-actuating the levers so as to allow the pump-rod to be moved again to effect discharge of liquid after it has returned to its normal position; a series of registers; a slidable selector-bar; a cam for actuating said bar; and a plunger carried by the selector-bar to engage any one of the registers when the register-actuating rod is actuated; the latter rod imparting movement to the plunger to move the selected register, and said cam being actuated from the pump-rod.

18. The combination, in a measuring pump, of a casing; a pump-rod; a cylinder; a plunger mounted in the cylinder and connected to the pump-rod; a discharge pipe connected to the cylinder; a series of independent registers; means for connecting any one of the registers with the pump-rod; a register-actuating rod paralleling the pump-rod; and arms on said shaft for limiting the movement of said pump-rod; said pump discharging the liquid on the upward movement of the plunger.

19. The combination with a pumping mechanism including a casing; a pump-rod having a rack; a plunger connected to said rod; a cylinder in which the plunger is mounted; a discharge pipe leading from the cylinder; an operating shaft; a gear wheel on the shaft in mesh with the rack of the pump-rod; a handle for turning said shaft; of a register-actuating rod mounted in the casing; a series of arms radially disposed on the register-actuating rod, each arm being in a different horizontal plane; an engaging member for engaging said arms mounted on the pump-rod; means for moving said register-actuating rod to aline any one of its arms with said engaging member whereby the register-actuating rod may be moved longitudinally in one direction; a spring for returning the register-actuating rod to its normal position after release from said engaging member; a series of registers; actuating levers therefor; a sliding head; a plunger carried by the sliding head and arranged to travel between the register-actuating rod and the registering levers; and means for effecting movement of the sliding head as the pump-rod is raised.

20. The combination of a casing; a pump-rod; a register-actuating rod; registering mechanism; means for actuating the registering mechanism; a notched disk on the register-actuating rod; a locking lever arranged to engage the notches of the disk; a cam on the pump-rod; and a lever controlled by the cam so that when the pump-rod is in its lowest position the locking lever is held out of engagement with the disk of the register-actuating rod; the locking lever entering one of the notches in the disk when the pump-rod is raised.

21. The combination of a casing; a pump-rod having teeth on one side forming a rack; means for moving the pump-rod; a register-actuating rod; an engaging member on the pump-rod; arms on the register-actuating rod which may be positioned for actuation by the pump-rod engaging member; a series of registers; an operating lever for each register; a plunger; means for moving the plunger with respect to the register-actuating rod into line with any one of the registering levers; a double pawl in engagement with the rack; a lever; a spring carried thereby and bearing against said pawl; a second lever for actuating the first-mentioned lever and engaged by the register-actuating rod; a locking lever for locking the first mentioned lever in either of its two positions; and means carried by the pump-rod for shifting the first-mentioned lever when the pump-rod reaches its lowest position, the levers being shifted by the register-actuating rod when the latter is raised.

22. The combination, in a measuring apparatus, of a pumping device; a series of registers; an operating lever for each of said registers; a register-actuating rod actuated by the pumping device; selective mechanism actuated by the pumping device and including means for actuating any of the registering levers; means for setting the register-actuating rod independently of the pumping device; means for automatically locking the register-actuating rod against independent movement when the pumping device is moved out of its normal position; and means for automatically unlocking the register-actuating rod to permit the independent movement thereof when the pumping device is returned to its normal position.

23. The combination, in a measuring apparatus, of a pumping device; a series of registers; operating levers therefor; a register-actuating rod actuated by the pumping device; selective mechanism actuated by the pumping device and including means for engagement with any one of the register levers; said means being actuated by the register-actuating rod; means for setting the register-actuating rod independently of the pumping device; means for automatically locking the register-actuating rod against independent movement when the pumping device is moved from its normal position; means for automatically unlocking the register-actuating rod to permit independent movement thereof when the pumping device is returned to its normal position; and means for automatically restoring the register-actuating rod to the position occupied before actuation by the pumping device.

In testimony whereof, I have signed my name to this specification in the presence of two subscribing witnesses.

CHARLES A. GEHMAN.

Witnesses:
WM. BROWN, Jr.,
WM. A. BARR.